United States Patent
Hsu

(10) Patent No.: US 7,073,082 B2
(45) Date of Patent: Jul. 4, 2006

(54) METHOD FOR CPU POWER MANAGEMENT AND BUS OPTIMIZATION

(75) Inventor: Ming-Wei Hsu, Taipei (TW)

(73) Assignee: VIA Technologies, Inc., Taipei (TW)

( * ) Notice: Subject to any disclaimer, the term of this patent is extended or adjusted under 35 U.S.C. 154(b) by 262 days.

(21) Appl. No.: 10/812,085

(22) Filed: Mar. 30, 2004

(65) Prior Publication Data

US 2005/0093524 A1   May 5, 2005

(30) Foreign Application Priority Data

Oct. 31, 2003   (TW) .............................. 92130420 A

(51) Int. Cl.
*G06F 1/26* (2006.01)
*G06F 1/32* (2006.01)
*G11C 7/00* (2006.01)

(52) U.S. Cl. ........................................ 713/323; 710/10

(58) Field of Classification Search .............. 323/324, 323/318, 352; 713/200, 310, 320, 323, 324, 713/330; 710/8, 10, 15, 19; 365/226–229; 327/142, 143; 702/182, 186

See application file for complete search history.

(56) References Cited

U.S. PATENT DOCUMENTS

| 6,357,013 B1 * | 3/2002 | Kelly et al. ................. 713/324 |
| 6,523,128 B1 * | 2/2003 | Stapleton et al. ........... 713/330 |
| 6,751,741 B1 * | 6/2004 | Kawahara et al. .......... 713/320 |
| 6,895,517 B1 * | 5/2005 | Wang .......................... 713/300 |
| 6,903,583 B1 * | 6/2005 | Habib et al. ................. 327/143 |
| 2005/0039063 A1 * | 2/2005 | Hsu et al. .................... 713/324 |
| 2005/0119860 A1 * | 6/2005 | Hsu et al. .................... 702/186 |

* cited by examiner

Primary Examiner—Matthew V. Nguyen
(74) Attorney, Agent, or Firm—Rabin & Berdo P.C.

(57) ABSTRACT

A method for CPU power management and bus optimization. First, the bus operates at an initial bus bandwidth and an initial bus frequency first. Next, power management settings of the CPU, the Northbridge and the Southbridge are initialized, such that the CPU operates at a CPU operating frequency with a CPU operating voltage. Next, a CPU operating frequency and voltage adjustment is output to the Southbridge. Next, a bus disconnection signal is output by the Southbridge to disconnect the CPU and the Northbridge, and a timer for calculating an elapsed time value is initialized. Next, the CPU operating frequency and the CPU operating voltage are adjusted according to the CPU operating frequency and voltage adjustment. Next, a bus connection signal is output by the Southbridge when the elapsed time value reaches a predetermined value. Next, the CPU and the Northbridge are reconnected by the bus according to the bus connection signal. Finally, the bus operates at the bus operating bandwidth and the bus operating frequency, and the CPU operates at the adjusted CPU operating frequency with the adjusted CPU operating voltage according to the CPU operating frequency and voltage adjustment.

15 Claims, 4 Drawing Sheets

METHOD FOR CPU POWER MANAGEMENT AND BUS OPTIMIZATION

BACKGROUND OF THE INVENTION

1. Field of the Invention

The present invention relates in general to a method for CPU power management and bus optimization. In particular, the present invention relates to a method for I/O link protocol technology and power management on AMD K8 platform.

2. Description of the Related Art

Legacy I/O bus architectures are widely used in embedded systems because they are low cost and easily implemented using established software and hardware standards. These busses, however, top out at 66 MHz or so. Recently, processors operating at 500 MHz and 1 GHz and up clock frequencies need a faster alternative to these low bandwidth busses.

Lightning data transport (LDT) I/O bus, sometimes referred to hyper-transport (HT) I/O bus, delivers the high bandwidth needed for high performance applications in networking, communications and other embedded applications in a flexible, extensible and easily implemented bus structure. A scalable solution, the LDT I/O bus is capable of providing bandwidth for next generation processors and communications systems. A multivendor standard that is easily implemented, the LDT solution provides a broad selection of bus widths and speeds meeting the power, space and cost requirements of a wide range of embedded systems from low cost desktop workstations to digital consumer applications, communication systems, and networking equipment.

The optimization of LDT I/O bus is achieved through disconnection and reconnection of the LDT I/O bus enabling the LDT I/O bus to perform at desired bandwidth and operating frequency.

FIG. 1 is a flowchart of the optimization of bandwidth and operating frequency of conventional LDT I/O bus. First, LDT bus is initialized by basic input/output system (BIOS) (S1), such as by setting the optimized bandwidth and operating frequency of LDT bus connected between CPU and the Northbridge after booting. For example, the bandwidth of the LDT bus may be initialized as 8-bit, but can be changed to 16-bit after optimization. The operating frequency of the LDT bus may be initialized as 200 MHz, but can be changed to 400 MHz, 600 MHz or 800 MHz after optimization. Here, the optimized bandwidth and operating frequency of LDT bus are set by BIOS. Next, power management resisters of CPU and the chipset comprising a Northbridge and a Southbridge are initialized by BIOS to set the related power setting (S2). Next, an auto-resume timer in the Southbridge is initialized for calculating an elapsed time value (S3). Next, BIOS issues a read request to a Southbridge power management I/O (PMIO) offset 15 h for asserting a signal LDTSTOP# (S4). Here, the asserting of the signal LDTSTOP# transforms a high level signal LDTSTOP# to a low level signal LDTSTOP#. The LDT bus connected between CPU and the Northbridge is disconnected when the signal LDTSTOP# is asserted.

Next, the Southbridge de-asserts the signal LDTSTOP# when the elapsed time value of the timer initialized in step S3 reaches a predetermined value (S5). Here, the de-asserting of the signal LDTSTOP# transforms a low level signal LDTSTOP# to a high level signal LDTSTOP#. Thus, the LDT bus connected between CPU and the Northbridge is reconnected when the signal LDTSTOP# is de-asserted (S6). Therefore, the LDT bus operates at optimized bandwidth and operating frequency set in BIOS. Thus, optimization of bandwidth and operating frequency of LDT bus is completed.

Power management is another important boot process in computer systems. FIG. 2 shows a conventional power management process. First, power management resisters of CPU and the chipset comprising the Northbridge and the Southbridge are initialized by BIOS to set the related power setting (S21). Next, maximum operating frequency and voltage of CPU are obtained from the register FIDVID_STATUS of CPU and stored in the register FIDVID_CTL of CPU by BIOS (S22). Next, an auto-resume timer in the Southbridge is initialized for calculating an elapsed time value (S23). Next, CPU outputs a FID/VID change message to the Southbridge and the signal LDTSTOP# is asserted when the Southbridge receives the FID/VID change message (S24). Here, the asserting of the signal LDTSTOP# also transforms a high level signal LDTSTOP# to a low level signal LDTSTOP#. The LDT bus connected between CPU and the Northbridge is disconnected when the signal LDTSTOP# is asserted. Next, operating frequency and voltage of CPU are changed according to the setting in FIDVID_CTL register (S25). Next, the Southbridge de-asserts the signal LDTSTOP# when the elapsed time value of the timer initialized in step S24 reaches another predetermined value (S26). Here, the de-asserting of the signal LDTSTOP# transforms a low level signal LDTSTOP# to a high level signal LDTSTOP#. Thus, the LDT bus connected between CPU and the Northbridge is reconnected when the signal LDTSTOP# is de-asserted (S27). Therefore, CPU operates at the adjusted operating frequency with the adjusted operating voltage. Thus, power management of CPU is achieved.

Power management of CPU and LDT bus optimization described are performed independently during boot. However, the disconnection and reconnection of LDT bus are performed in both processes. The repeated hardware operation causes booting delay and complicates of boot process.

SUMMARY OF THE INVENTION

The object of the present invention is thus to provide a method for CPU power management and bus optimization combining the processes of power management of CPU with bus optimization into a single flow, avoiding repeated disconnection and reconnection of the LDT bus, thereby improving boot efficiency.

To achieve the above-mentioned object, the present invention provides a method for CPU power management and bus optimization. First, the bus operates at an initial bus bandwidth and an initial bus frequency. Next, power management settings of the CPU, the Northbridge and the Southbridge are initialized, such that the CPU operates at a CPU operating frequency with a CPU operating voltage. Next, a CPU operating frequency and voltage adjustment is output to the Southbridge. Next, a bus disconnection signal is output by the Southbridge to disconnect the CPU and the Northbridge, and a timer for calculating an elapsed time value is initialized. Next, the CPU operating frequency and the CPU operating voltage are adjusted according to the CPU operating frequency and voltage adjustment. Next, a bus connection signal is output by the Southbridge when the elapsed time value reaches a predetermined value. Next, the CPU and the Northbridge are reconnected by the bus according to the bus connection signal. Finally, the bus operates at the bus operating bandwidth and the bus operating frequency, and the CPU operates at the adjusted CPU operating frequency with the adjusted CPU operating voltage according to the CPU operating frequency and voltage adjustment.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
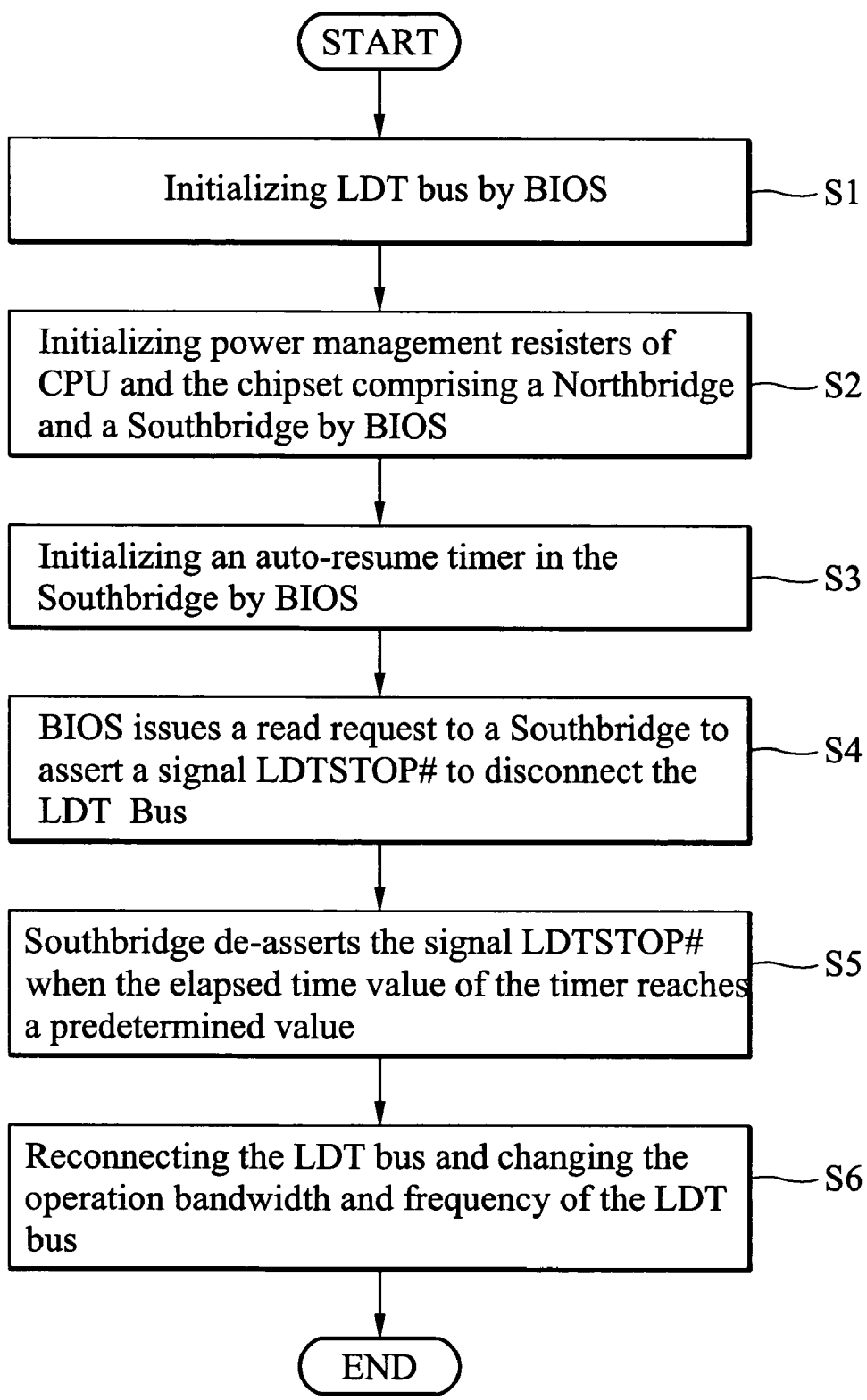
FIG. 1 is a flowchart of optimization of bandwidth and operating frequency of conventional LDT I/O bus.
Figure 2:
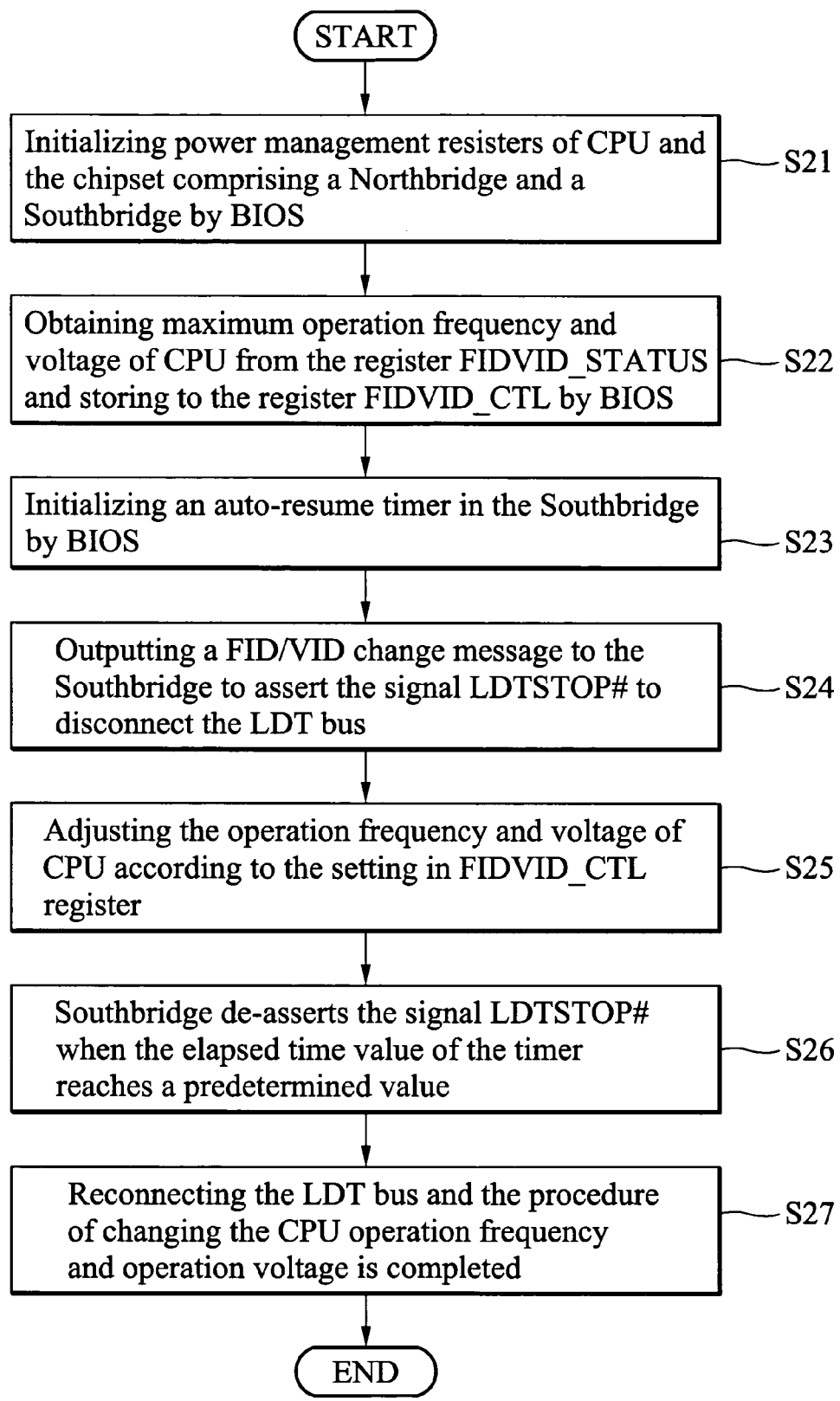
FIG. 2 shows a conventional power management process.
Figure 3:
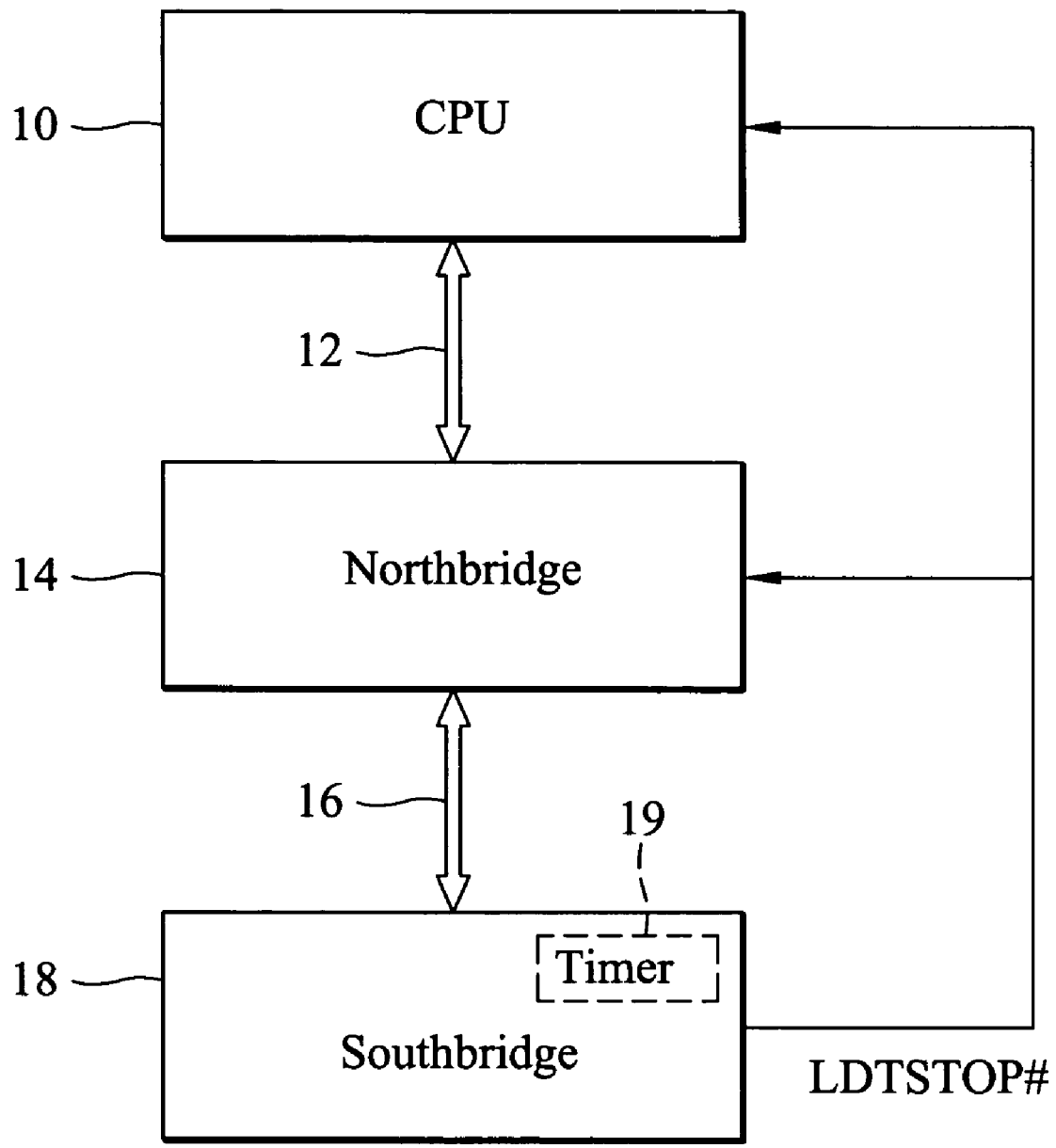
FIG. 3 is a schematic diagram of a computer system comprising LDT bus.

FIG. 3 shows a schematic diagram of a computer system comprising an LDT bus. As shown in the figure, LDT bus 12 is connected between CPU 10 and the Northbridge 14. Here, CPU 10 is an AMD K8 CPU, although the invention encompasses a wide range of CPU types, makes and models. Another bus 16 is connected between the Northbridge 14 and the Southbridge 18. LDT bus 12, connected between CPU 10 and the Northbridge 14, is disconnected and reconnected during power management of CPU and LDT bus optimization. Disconnection and reconnection of LDT bus 12 are performed according to the voltage level of the signal LDTSTOP# output by the Southbridge 18. The Southbridge 18 asserts the signal LDTSTOP# and outputs the asserted signal LDTSTOP#. LDT bus 12 is disconnected when both CPU 10 and the Northbridge 14 receive the asserted signal LDTSTOP#. Next, the timer 19 of the Southbridge 18 begins to calculate an elapsed time value. The Southbridge 18 de-asserts the signal LDTSTOP# when the elapsed time value of the timer 19 reaches a predetermined value. LDT bus 12 is reconnected when both CPU 10 and the Northbridge 14 receive the de-asserted signal LDTSTOP#. Thus, LDT bus operates at another operating frequency and bandwidth, and CPU operates at a different operating voltage and frequency.

Figure 4:
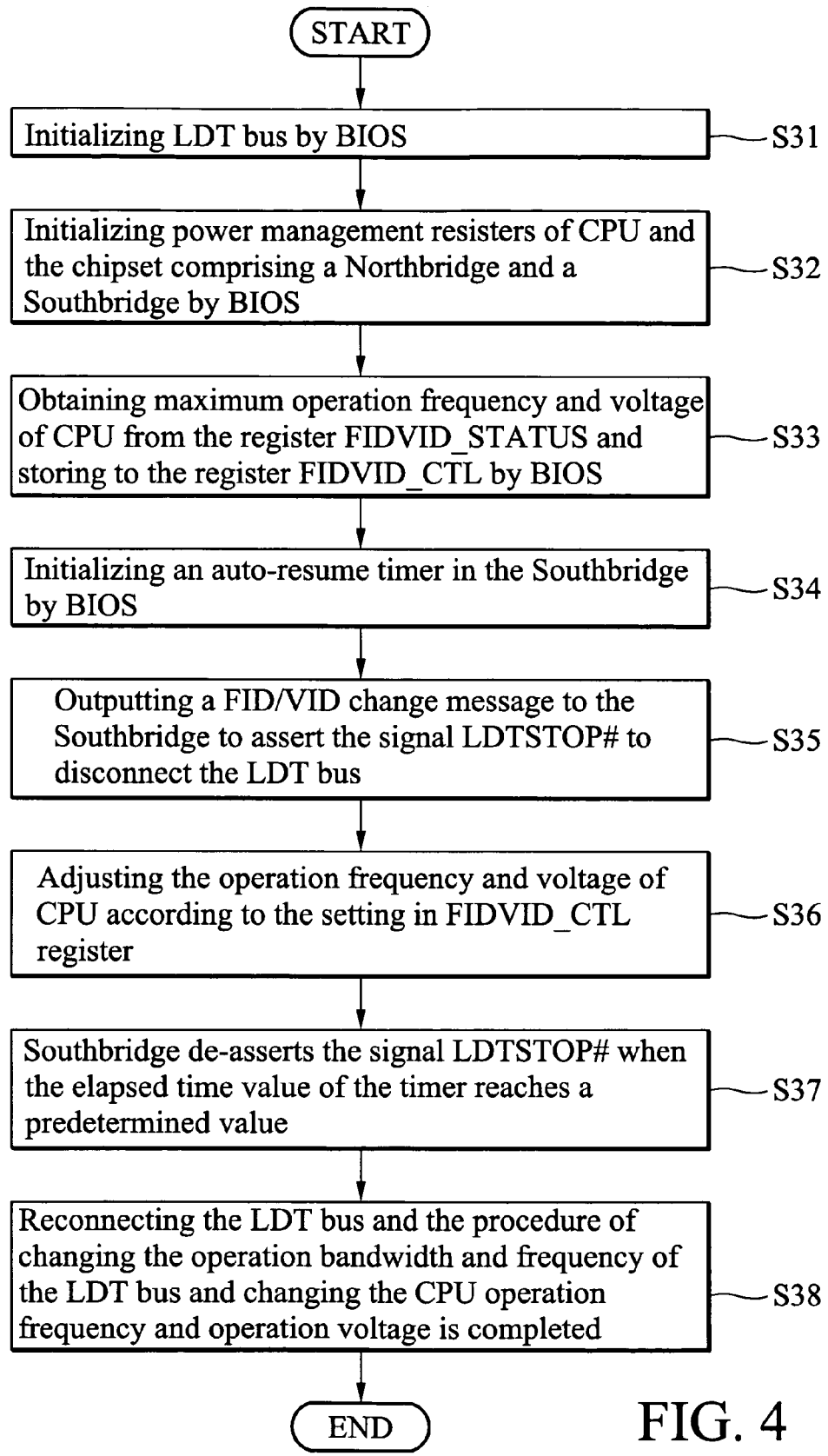
FIG. 4 is a flowchart of LDT bus optimization and CPU power management according to the present invention.

FIG. 4 is a flowchart of the LDT bus optimization and CPU power management according to the present invention. According to the present invention, LDT bus optimization is completed during CPU power management. Here, CPU power management is carried out by "AMD PowerNow!" technology.

AMD PowerNow! technology is an advanced, second-generation power-management feature that reduces the overall power consumed by the processor through control of voltage and frequency. This power-saving technology is designed to be dynamic and flexible by enabling instant, on-the-fly, and independent control of both the voltage and frequency. AMD PowerNow! technology enables reduced power consumption with performance on demand for power-sensitive embedded applications. For notebooks, operating voltage and frequency of CPU are decreased to save power, increase battery life, and decrease system temperature when CPU loading is low. The operating voltage and frequency of CPU are both increased as more operating steps are required. The CPU loading is detected by the operating system, whereby operating voltage and frequency of which is adjusted. All possible settings of operating voltage and frequency of the CPU are stored in BIOS power management settings and are adjustable by users. The settings of operating frequency and voltage correspond to CPU type.

In FIG. 4, first, LDT bus is initialized by basic input/output system (BIOS) (S31), such as by setting the optimized bandwidth and operating frequency of LDT bus connected between CPU and the Northbridge after booting. For example, the bandwidth of the LDT bus may be initialized as 8-bit, but can be changed to 16-bit after optimization. The operating frequency of the LDT bus may be initialized as 200 MHz, but can be changed to 400 MHz, 600 MHz or 800 MHz after optimization. Here, the optimized bandwidth and operating frequency of LDT bus are set by BIOS. Next, power management resisters of CPU and the chipset comprising the Northbridge and the Southbridge are initialized by BIOS to set the related power setting (S32). Thus, the CPU operates at an initial frequency and voltage, and CPU loading is detected.

Next, maximum operating frequency and voltage of CPU are obtained from register FIDVID_STATUS of CPU and stored to a register FIDVID_CTL of CPU by BIOS (S33). Next, an auto-resume timer in the Southbridge is initialized for calculating an elapsed time value (S34). Next, CPU outputs a FID/VID change message to the Southbridge according to the maximum operating frequency and voltage and the signal LDTSTOP# is asserted when the Southbridge receives the FID/VID change message (S35). Thus, operating voltage and frequency of the CPU are changed according to the FID/VID change message before LDT bus is reconnected. Here, the adjusted operating voltage and operating frequency of CPU must respectively be lower than or equal to the maximum operating frequency and maximum operating voltage.

Here, the asserting of the signal LDTSTOP# also transforms a high level signal LDTSTOP# to a low level signal LDTSTOP#. The LDT bus connected between CPU and the Northbridge is disconnected when the signal LDTSTOP# is asserted. Next, the operating frequency and voltage of CPU are changed according to the setting in FIDVID_CTL register (S36). Next, the Southbridge de-asserts the signal LDTSTOP# when the elapsed time value of the timer initialized in step S34 reaches another predetermined value (S37). Here, the de-asserting of the signal LDTSTOP# transforms a low level signal LDTSTOP# to a high level signal LDTSTOP#. Thus, the LDT bus connected between CPU and the Northbridge is reconnected when the signal LDTSTOP# is de-asserted (S38). Simultaneously, the LDT bus operates at the optimized bandwidth and operating frequency preset in BIOS in step S31. Thus, optimization of bandwidth and operating frequency of LDT bus, and power management of CPU, are simultaneously achieved.

The method for CPU power management and bus optimization according to the present invention combines conventional power management of CPU with conventional LDT bus optimization, which are performed independently during boot. Thus, logic operation and hardware setting time of CPU power management and bus optimization are decreased. In addition, while conventional power management of CPU and conventional LDT bus optimization comprise 13 steps, only 8 steps are required to complete the operations according to the present invention. Thus, boot efficiency is significantly improved.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for CPU power management and bus optimization for a system comprising a Northbridge, a bus coupled between the CPU and the Northbridge, and a Southbridge, the method comprising the following steps:
   setting an initial bus bandwidth, an initial bus frequency, a bus operating bandwidth and a bus operating frequency of the bus coupled between the CPU and the Northbridge, wherein the bus operates at the initial bus bandwidth and the initial bus frequency;
   initializing power management settings of the CPU, the Northbridge and the Southbridge, wherein the CPU operates at a CPU operating frequency with a CPU operating voltage;
   obtaining a maximum operating frequency and a maximum operating voltage for the CPU;
   outputting a CPU operating frequency and voltage adjustment to the Southbridge according to the maximum operating frequency and the maximum operating voltage;
   outputting a bus disconnection signal by the Southbridge to disconnect the CPU and the Northbridge, initializing a timer for calculating an elapsed time value;
   adjusting the CPU operating frequency and the CPU operating voltage according to CPU operating frequency and voltage adjustment;
   outputting a bus connection signal by the Southbridge when the elapsed time value reaches a predetermined value; and
   reconnecting of the CPU and the Northbridge by the bus according to the bus connection signal, wherein the bus operates at the bus operating bandwidth and the bus operating frequency, the CPU operating at the adjusted CPU operating frequency with the adjusted CPU operating voltage according to the CPU operating frequency and voltage adjustment.

2. The method as claimed in claim 1, wherein the bus is a lightning data transport bus.

3. The method as claimed in claim 1, wherein the bus is a hyper-transport bus.

4. The method as claimed in claim 1, wherein the bus disconnection signal and the bus connection signal are output by a single output terminal.

5. A method for CPU power management and bus optimization for a system comprising a Northbridge, a bus coupled between the CPU and the Northbridge, and a Southbridge, the method comprising the following steps:
   setting an initial bus bandwidth, an initial bus frequency, a bus operating bandwidth and a bus operating frequency of the bus coupled between the CPU and the Northbridge, wherein the bus operates at the initial bus bandwidth and the initial bus frequency;
   initializing power management setting of the CPU, the Northbridge and the Southbridge, wherein the CPU operates at a first CPU operating frequency with a first CPU operating voltage;
   detecting CPU loading and setting a second CPU operating frequency and a second CPU operating voltage according to the detection;
   outputting a CPU operating frequency and voltage adjustment to the Southbridge;
   outputting of a bus disconnection signal by the Southbridge to disconnect the CPU and the Northbridge, initializing a timer for calculating an elapsed time value;
   outputting of a bus connection signal by the Southbridge when the elapsed time value reaches a predetermined value; and
   reconnection of the CPU and the Northbridge by the bus according to the bus connection signal, wherein the bus operates at the bus operating bandwidth and the bus operating frequency, and the CPU operates at the second CPU operating frequency with the second CPU operating voltage.

6. The method as claimed in claim 5, wherein the bus is a lightning data transport bus.

7. The method as claimed in claim 5, wherein the bus is a hyper-transport bus.

8. The method as claimed in claim 5, wherein the bus disconnection signal and the bus connection signal are output by a single output terminal.

9. The method as claimed in claim 5, further comprising the following steps:
   obtaining a maximum operating frequency and a maximum operating voltage of the CPU; and
   setting the second CPU operating frequency and the second CPU operating voltage according to the maximum operating frequency and the maximum operating voltage of the CPU.

10. The method as claimed in claim 9, wherein the bus disconnection signal and the bus connection signal are generated by asserting and de-asserting a signal output by the Southbridge.

11. A method for CPU power management and bus optimization for a system comprising a Northbridge, a bus coupled between the CPU and the Northbridge, and a Southbridge, the method comprising the following steps:
   setting an initial bus bandwidth, an initial bus frequency, a bus operating bandwidth and a bus operating frequency of the bus coupled between the CPU and the Northbridge, wherein the bus operates at the initial bus bandwidth and the initial bus frequency;
   initializing power management settings of the CPU, the Northbridge and the Southbridge, wherein the CPU operates at a first CPU operating frequency with a first CPU operating voltage;
   obtaining a maximum operating frequency and a maximum operating voltage of the CPU;
   detecting the loading on the CPU and setting a second CPU operating frequency and a second CPU operating voltage according to the detection;
   outputting a CPU operating frequency and voltage adjustment to the Southbridge according to the maximum operating frequency and the maximum operating voltage;
   outputting of a bus disconnection signal by the Southbridge to disconnect the CPU and the Northbridge, initializing a timer for calculating an elapsed time value;
   outputting of a bus connection signal by the Southbridge when the elapsed time value reaches a predetermined value; and reconnecting of the CPU and the Northbridge by the bus according to the bus connection signal, wherein the bus operates at the bus operating bandwidth and the bus operating frequency, and the CPU operates at the second CPU operating frequency with the second CPU operating voltage.

12. The method as claimed in claim 11, wherein the bus is a lightning data transport bus.

13. The method as claimed in claim 11, wherein the bus is a hyper-transport bus.

14. The method as claimed in claim 11, wherein the bus disconnection signal and the bus connection signal are output by a single output terminal.

15. The method as claimed in claim 14, wherein the bus disconnection signal and the bus connection signal are generated by asserting and de-asserting a signal output by the Southbridge.

* * * * *